(12) United States Patent
Park

(10) Patent No.: US 11,448,272 B2
(45) Date of Patent: Sep. 20, 2022

(54) CONTROL METHOD FOR TRANSMISSION OF ELECTRIC VEHICLE

(71) Applicants: Hyundai Motor Company, Seoul (KR); Kia Motors Corporation, Seoul (KR)

(72) Inventor: Jong Yun Park, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 271 days.

(21) Appl. No.: 16/993,726

(22) Filed: Aug. 14, 2020

(65) Prior Publication Data

US 2021/0310526 A1    Oct. 7, 2021

(30) Foreign Application Priority Data

Apr. 6, 2020    (KR) .................. 10-2020-0041427

(51) Int. Cl.
| | |
|---|---|
| *B60K 17/06* | (2006.01) |
| *F16D 48/06* | (2006.01) |
| *F16H 61/02* | (2006.01) |
| *F16H 61/28* | (2006.01) |
| *F16D 23/02* | (2006.01) |
| *F16H 61/00* | (2006.01) |

(52) U.S. Cl.
CPC .............. *F16D 48/06* (2013.01); *B60K 17/06* (2013.01); *F16H 61/0204* (2013.01); *F16D 23/02* (2013.01); *F16D 2500/10412* (2013.01); *F16D 2500/10456* (2013.01); *F16D 2500/7041* (2013.01); *F16H 2061/0053* (2013.01); *F16H 2061/283* (2013.01)

(58) Field of Classification Search
CPC . F16D 48/06; F16D 2500/7041; B60K 17/06; B60K 61/0204; F16H 2061/2838; F16H 2061/283
See application file for complete search history.

(56) References Cited

U.S. PATENT DOCUMENTS

| | | | |
|---|---|---|---|
| 6,564,662 B2 * | 5/2003 | Yamamoto | F16H 61/32 74/335 |
| 9,057,436 B1 * | 6/2015 | Itoo | F16H 63/30 |
| 9,169,879 B2 * | 10/2015 | Mori | F16H 61/2807 |

FOREIGN PATENT DOCUMENTS

KR    10-2017-0018220 A    2/2017

* cited by examiner

*Primary Examiner* — Tinh Dang
(74) *Attorney, Agent, or Firm* — Morgan, Lewis & Bockius LLP

(57) ABSTRACT

A control method of a transmission of an electric vehicle provided with a transmission having a sleeve gear having an inclined chamfer on a first side of the sleeve gear and a flat chamfer on a second side of the sleeve gear, may include measuring a maximum movable stroke of a sleeve having the sleeve gear by moving the sleeve axially to both sides by a controller; determining a reference range to which the measured maximum stroke pertains from predetermined reference ranges by the controller; and determining and setting a neutral position of the sleeve using a predetermined determination method, depending on the determined reference range by the controller.

11 Claims, 5 Drawing Sheets

FIG. 3

| | Case1 (NO CONTACT) | Case2 FORWARD CONTACT | Case3 BACKWARD CONTACT |
|---|---|---|---|
| RELATED ART | ω=0, ω=2rpm | ω=0, ω=2rpm | ω=0, ω=2rpm |
| | IMMEDIATELY ENGAGED | ENGAGED BY GEAR RATIO DIFFERENCE (WITHIN 0.2 SEC) | NOT ENGAGED → FRICTION CLUTCH DISENGAGED |
| INVENTION | ω=0, ω=2rpm | ω=0, ω=2rpm | |
| | IMMEDIATELY ENGAGED | ENGAGED BY GEAR RATIO DIFFERENCE (WITHIN 0.2 SEC) | |

CONTROL METHOD FOR TRANSMISSION OF ELECTRIC VEHICLE

CROSS-REFERENCE TO THE RELATED APPLICATION

The present application claims priority to Korean Patent Application No. 10-2020-0041427, filed on Apr. 6, 2020, in the Korean Intellectual Property Office, the entire contents of which is incorporated herein for all purposes by this reference.

BACKGROUND OF THE INVENTION

Field of the Invention

The present invention relates to a control method for a transmission of an electric vehicle.

Description of Related Art

An electric vehicle is configured to be driven using a motor as a power source and a transmission is also included to configure the powertrain in an electric vehicle, so it is possible to relatively reduce the capacity of a motor and satisfy the power performance required for the electric vehicle.

The transmission for electric vehicles may be able to have excellent power transmission efficiency, needs a simple structure and high durability, and may be able to secure excellent shifting performance through accurate control.

To secure excellent power transmission efficiency, the transmission for electric vehicles employs a synchromesh type, which is the shifting mechanism of the conventional manual transmissions, without a clutch between a motor which is a power source and an input shaft, but in the instant case, power which is input to the transmission is not stopped in shifting, so a problem may be generated in the durability of parts.

If the structures of parts are changed to deal with the problem in the durability of parts, a referencing type which is used in common transmission employing the synchromesh type in the related art cannot be used.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a control method for a transmission of an electric vehicle, the control method being able to accurately control a transmission and consequently secure excellent shifting performance of the vehicle by providing a referencing type required for control of the transmission of an electric vehicle which has the shifting mechanism of a modified synchromesh type without a clutch for separating the input shaft of a transmission from a power source.

To solve the above problem, a control method of a transmission of an electric vehicle provided with a transmission having a sleeve gear having an inclined chamfer on a first side of the sleeve gear and a flat chamfer on a second side of the sleeve gear according to various exemplary embodiments of the present invention includes: measuring a maximum movable stroke of a sleeve having the sleeve gear by moving the sleeve axially to both sides by a controller; determining a reference range to which the measured maximum stroke pertains from predetermined reference ranges by the controller; and determining and setting a neutral position of the sleeve using a predetermined determination method, depending on the determined reference range by the controller.

The predetermined reference ranges may be a first range, a second range, a third range, and a fourth range that depend on four different maximum strokes.

The first range, the second range, the third range and the fourth range may be sequentially set in order of long maximum strokes.

When the sleeve is moved axially, the maximum stroke which is measured when a portion on which an inclined chamfer is formed in the sleeve gear is engaged with a corresponding clutch gear and a portion on which a flat chamfer is formed is also engaged with a corresponding clutch gear may pertain to the first range; the maximum stroke which is measured when the portion on which the inclined chamfer is formed in the sleeve gear is engaged with a corresponding clutch gear and the portion on which the flat chamfer is formed is baulked by a corresponding clutch gear may pertain to the second range; the maximum stroke which is measured when the portion on which the inclined chamfer is formed in the sleeve gear is baulked by a corresponding clutch gear and the portion on which the flat chamfer is formed is engaged with a corresponding clutch gear may pertain to the third range; and the maximum stroke which is measured when the portion on which the inclined chamfer is formed in the sleeve gear is baulked by a corresponding clutch gear and the portion on which the flat chamfer is formed is also baulked by a corresponding clutch gear may pertain to the fourth range.

When the measured maximum stroke pertains to the first range, the neutral position of the sleeve may be set as a position obtained by dividing the measured maximum stroke by 2.

When the measured maximum stroke pertains to the second range, the neutral position of the sleeve may be set as a position to which the sleeve has moved by a predetermined first reference value away from a position where the sleeve has maximally moved to the portion on which the inclined chamfer is formed.

The first reference value may be set as a stroke of the sleeve from a position where the portion on which the inclined chamfer of the sleeve gear has been engaged with a corresponding clutch gear to the neutral position.

When the measured maximum stroke pertains to the third range or the fourth range, the neutral position of the sleeve may be set as a position to which the sleeve has moved by a predetermined second reference value away from a position where the sleeve has maximally moved to the portion on which the inclined chamfer is formed.

The second reference value may be set as a stroke of the sleeve from a position where the portion on which the inclined chamfer of the sleeve gear has been baulked by a corresponding clutch gear to the neutral position.

According to various exemplary embodiments of the present invention, it is possible to accurately control a transmission and consequently secure excellent shifting performance of the vehicle by providing a referencing type required for control of an electric vehicle transmission having the shifting mechanism of a modified synchromesh type without a clutch for separating the input shaft of a transmission from a power source.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 is a table comparing the operation effects of a transmission to which the transmission shown in FIG. 1 may be applied with the related art;

Figure 1:
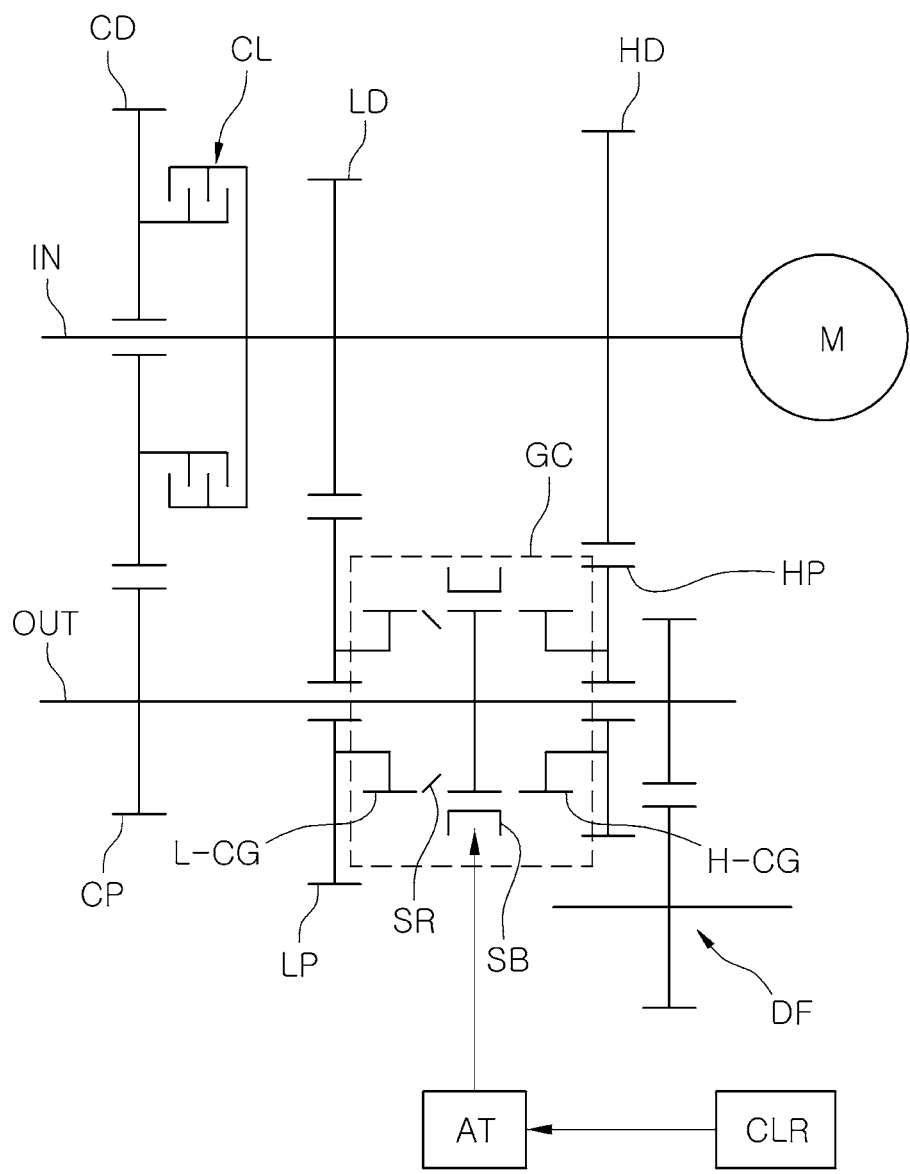
FIG. 1 is a view showing the configuration of a transmission of an electric vehicle to which various exemplary embodiments of the present invention may be applied.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Figure 2:
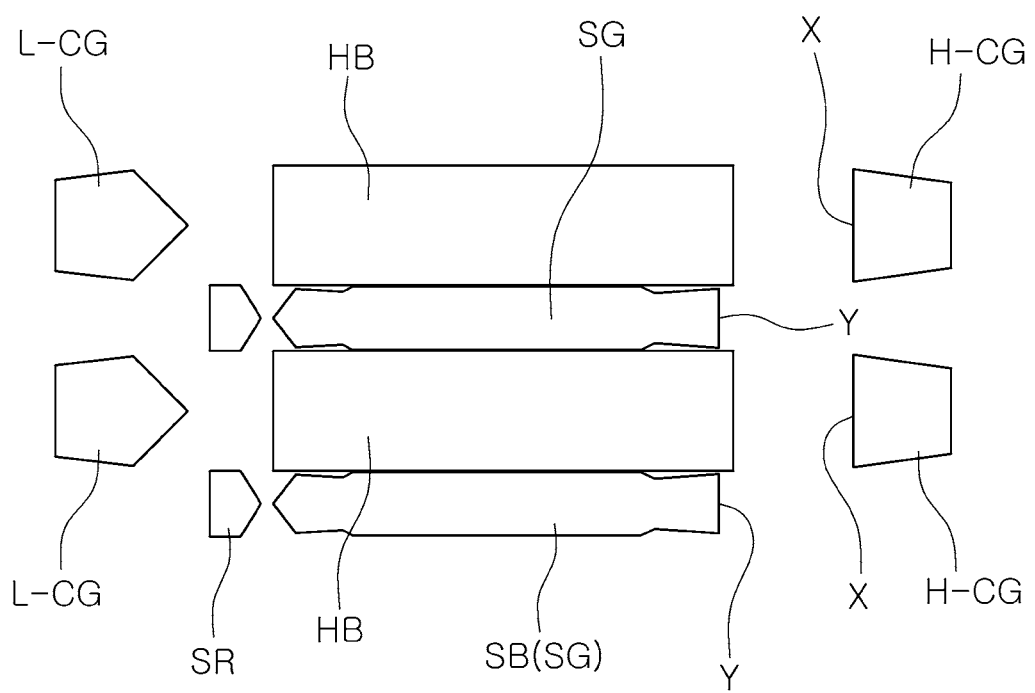
FIG. 2 is a view showing in detail the structure of an engaging type clutch shown in FIG. 1.

FIG. 1 and FIG. 2 show a transmission of an electric vehicle to which various exemplary embodiments of the present invention may be applied, in which a motor M is directly connected to an input shaft IN, and a high-stage driving-gear HD and a low-stage driving-gear LD are fixedly mounted on the input shaft IN.

A high-stage driven-gear HP and a low-stage driven-gear LP respectively engaged with the high-stage driving-gear HD and the low-stage driving-gear LD are rotatably mounted on an output shaft OUT mounted in parallel with the input shaft IN.

A clutch driving-gear CD and a clutch driven-gear CP that have a gear ratio smaller than the gear ratio of the high-stage driving-gear HD and the high-stage driven-gear HP are mounted in mesh with each other between the input shaft IN and the output shaft OUT.

The gear ratio of the clutch driving-gear CD and the clutch driven-gear CP is set to be smaller than the gear ratio of the high-stage driving-gear HD and the high-stage driven-gear HP within a small range of about 0.5 or less.

The clutch driving-gear CD is rotatably mounted on the input shaft IN and may be connected to the input shaft IN by a friction clutch CL.

An engaging type clutch GC which is a shifting device similar to a synchromesh type synchronizer of the related art is provided between the high-stage driven-gear HP and the low-stage driven-gear LP on the output shaft OUT.

In the engaging type clutch GC, a hub HB is fixed to the output shaft OUT and a sleeve SB axially sliding with respect to the hub HB is provided, and a clutch gear L-CG of the low-stage driven-gear LP is mounted at the left side of the hub HB. Accordingly, when the sleeve SB is engaged with the clutch gear L-CG of the low-stage driven-gear LP, the low-stage driven-gear LP is connected to the output shaft OUT, so power from the input shaft IN may be transmitted to the output shaft OUT through the low-stage driving-gear LD and the low-stage driven-gear LP.

For reference, the sleeve SB is configured to be slid axially left and right by an actuator AT which is controlled by a controller CLR.

A synchronizer ring SR is mounted between the clutch gear L-CG of the low-stage driven-gear LP an the hub HB, so when the sleeve SB is axially moved toward the low-stage driven-gear LP, the synchronizer ring SR performs synchronization first while generating friction with the clutch gear L-CG, so that the sleeve SB may be easily engaged with the clutch gear L-CG of the low-stage driven-gear LP.

That is, a common synchromesh type synchronizer of the related art is mounted between the hub HB and the low-stage driven-gear LP.

Meanwhile, a configuration modified from a common synchromesh type synchronizer is mounted between the hub HB and the high-stage driven-gear HP.

That is, since there is no synchronizer ring between the hub HB and the clutch gear H-CG of the high-stage driven-gear HP, the clutch gear H-CG of the high-stage driven-gear HP and the sleeve SB configure a so-called "dog clutch" of the related art.

Furthermore, the portions facing each other of the clutch gear H-CG of the high-stage driven-gear HP and the sleeve gear SG of the sleeve SB are flat chamfers X and Y having flat shapes perpendicular to the axial direction thereof, as shown in the figures.

The 'axial direction' means the longitudinal direction of the input shaft IN or the output shaft OUT.

For reference, FIG. 2 shows a cross-section circumferentially cutting the hub HB around the center line of the assembly of the hub HB and the sleeve SB spline-coupled to each other, in which some of hubs HB and sleeve gears SG of sleeves SB that are alternately mounted are shown at the center, the clutch gears H-CG of the high-stage driven-gear HP are shown at the right side, and the clutch gears L-CG of the low-stage driven-gears LP and the synchronizer rings SR are shown at the left side thereof.

As described above, the synchronizer ring SR is mounted between the low-stage driven-gear LP and the hub HB, the clutch gear L-CG of the low-stage driven-gear LP has a chamfer axially inclined toward the sleeve gear SG, which is the same as a common synchromesh type shifting mechanism of the related art, and the corresponding sleeve gear SG also has an axially inclined chamfer.

Accordingly, in a vehicle provided with the transmission having the configuration described above, when shifting into a lower gear is performed by sliding the sleeve SB toward the low-stage driven-gear LP from a neutral state positioned at the hub HB, shifting is performed through synchronization by the synchronizer ring SR in the same way as known in the art.

However, a shifting process in which the clutch gear L-CG of the low-stage driven-gear LP goes beyond the neutral state engaged with the sleeve SB and the sleeve SB is engaged with the clutch gear H-CG of the high-stage driven-gear HP is different from the related art, as described below.

First, synchronization is performed by engaging the friction clutch CL before the sleeve SB is brought in contact with the clutch gear H-CG of the high-stage driven-gear HP. That is, since there is no specific synchronizer ring as, synchronization is not performed by a synchronizer ring, and the clutch gear H-CG of the high-stage driven-gear HP and the sleeve SB are synchronized by engaging the friction clutch CL.

This is possible because the gear ratio of the clutch driving-gear CD and the clutch driven-gear CP is almost close to the gear ratio of the high-stage driving-gear HD and the high-stage driven-gear HP, so when the friction clutch CL is engaged, the speeds of the output shaft OUT and the hub HB that are relatively lower than that of the high-stage driven-gear HP gradually increase, whereby a point in time at which the sleeve SB and the high-stage driven gear HP are synchronized is generated and there is little speed difference even later.

Since synchronization is performed in the present way, shifting is performed by pushing the sleeve SB toward the high-stage driven gear HP, in which the sleeve gear SG and the clutch gear H-CG of the high-stage driven gear HP meet each other in two cases shown in the lower row in FIG. 3.

That is, there are a case at the left side in which the sleeve gear SG and the clutch gear H-CG accurately alternately meet each other, so they are immediately engaged without interference, and a case at the right side in which the flat chamfers X and Y meet and hit against each other.

When the flat chamfer Y of the sleeve gear SG and the flat chamfer X of the clutch gear H-CG meet and hit against each other, as shown in the figure, they are naturally accurately alternately engaged with each other when a slight time passes because the number of revolutions of the sleeve gear SG is slightly greater than the number of revolutions of the clutch gear H-CG.

The reason that the number of revolutions of the sleeve gear SG is slightly greater than the number of revolutions of the clutch gear H-CG is that since, as described above, the gear ratio of the clutch driving-gear CD and the clutch driven-gear CP is slightly smaller than the gear ratio of the high-stage driving-gear HD and the high-stage driven-gear HP, when synchronization is attempted by engaging the friction clutch CL, the speeds of the hub HB and the sleeve SB connected to the output shaft OUT finally become slightly higher than that of the high-stage driven-gear HP.

For reference, in FIG. 3, a slight relative speed difference is shown by showing the number of revolutions ω of the clutch gear H-CG as 0 RPM and showing the number of revolutions ω of the sleeve gear SG as 2 RPM to simply compare the number of revolutions of the clutch gear H-CG and the number of revolutions of the sleeve gear SG.

Meanwhile, three cases of shifting by a structure of the related art are shown and compared in the upper row in FIG. 3, in which the sleeve gear SG and the clutch gear H-CG both have a chamfer axially inclined like a common synchromesh type shifting mechanism of the related art.

In the case 1, there is no contact, and when the sleeve gear SG is pressed to be engaged with the clutch gear H-CG, the sleeve gear SG and the clutch gear H-CG accurately alternately meet each other, so that the sleeve gear SG and the clutch gear H-CG are immediately engaged with the chamfers hitting against each other and shifting is finished.

In the case 2, there is forward contact, and the chamfer of the sleeve gear SG meets the chamfer of the clutch gear H-CG in contact with the chamfer, but the directional component that guides the sleeve gear SG when the sleeve gear SG is pressed to the clutch gear coincides with the rotation direction of the sleeve gear SG due to the inclination made by the two meeting chamfers, so that the sleeve gear SG may be easily moved inside between clutch gears H-CG, as time passes, whereby shifting is finished without a specific problem as time passes.

However, in the case 3, there is backward contact, and the inclination made by the two meeting chamfers of the sleeve gear SG and the clutch gear H-CG is opposite to that of the case 2, that is, the directional component that guides the sleeve gear SG when the sleeve gear SG is pressed toward the clutch gear H-CG is opposite to the rotation direction of the sleeve gear SG due to the inclination made by the two meeting chamfers, and thus engaging is not performed well even though time passes.

In the instant case, the sleeve gear SG and the friction clutch CL may be engaged only by decreasing the relative torque of the sleeve gear SG by disengaging the friction clutch CL, and if the state described above frequently occurs, the two chamfers of the sleeve gear SG and the clutch gear H-CG are deformed, damaged, or worn by each other, so that the durability of the transmission decreases.

That is, to solve the problems described above that are generated when there is a remaining inclined chamfer on the sleeve gear SG and the clutch gear H-CG, the transmission shown in FIG. 1 and FIG. 2 is configured such that side effects of noise, damage, and wear due to meeting of inclined chamfers described above may be removed and the sleeve gear SG and the clutch gear H-CG may be naturally and easily engaged as a slight time passes even if they are brought in contact with each other in a state in which they are not mounted accurately alternately to be engaged well, by forming the flat chamfers X and Y on the portions facing each other of the sleeve gear SG and the clutch gear H-CG, as described above.

For reference, as exemplified in FIG. 3, in a common automotive transmission, when the rotation speed difference between the clutch gear H-CG having a flat chamfer A and the sleeve gear SG having a flat chamfer B is set as about 2 RPM with the friction clutch CL completely engaged, shifting is finished within around 0.2 seconds even if the sleeve gear SG and the clutch gear H-CG are not appropriately mounted and meet each other while coming in contact with each other, so it may be seen that this is sufficient in terms of quick shifting.

To accurately control the transmission of an electric vehicle described above, there is a demand for appropriate referencing in ready-on of the vehicle.

For reference, 'ready-on' means the state in which an electric vehicle is ready for being immediate start by connecting a high-voltage battery to a high-voltage circuit of the vehicle using a power relay assembly etc.

Furthermore, the 'referencing', which is for setting in advance a reference position of the sleeve SB when the controller CLR controlling the transmission axially moves the sleeve SB using the actuator AT for shifting, means setting the position of the sleeve in a neutral state in which the sleeve SB is positioned at the center portion without being engaged with any one of clutch gears at both sides.

Referring to FIGS. 4A, 4B, 4C and 4D, in the transmission having the structure described above, a total of four cases in FIGS. 4A, 4B, 4C and 4D may be possible, as described above, for the axial maximum movable range of the sleeve SB, depending on the relative positions in rotation directions of the hub HB, the low-stage driven-gear LP, and the high-stage driven-gear HP.

Figure 4A:
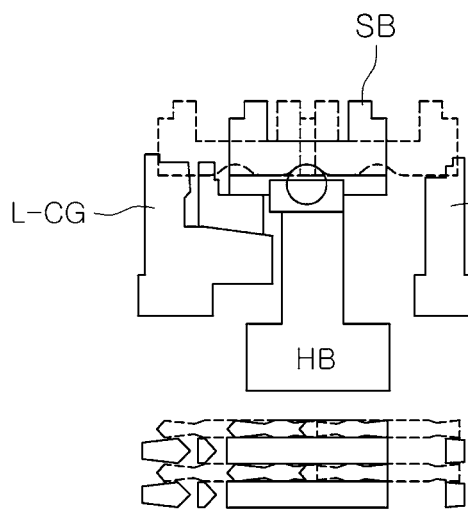
FIGS. 4A, 4B, 4C and 4D are views comparing four cases which may occur when a sleeve is maximally moved axially to both sides in the transmission shown in FIG. 1.

In the FIG. 4A, the sleeve SB is in full mesh with the clutch gear L-CG of the low-stage driven-gear LP at the left side and is also in full mesh with the clutch gear H-CG of the high-stage driven-gear HP at the right side, which is the most ideal situation.

Figure 4B:
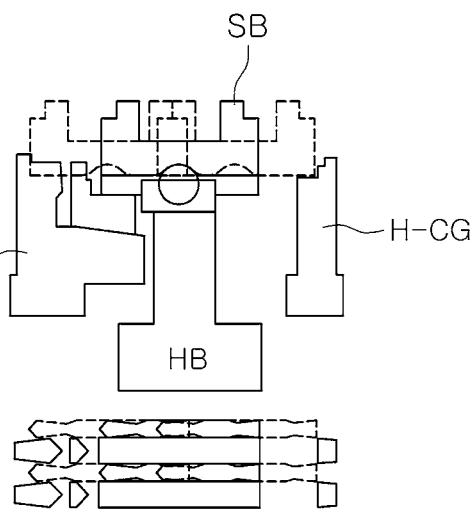

The FIG. 4B is a baulking state in which the sleeve is sufficiently in mesh with the left clutch gear L-CG but is not in mesh with the right clutch gear H-CG, and the flat chamfer Y of the sleeve gear SG and the flat chamfer X of a clutch gear meet each other.

Figure 4C:
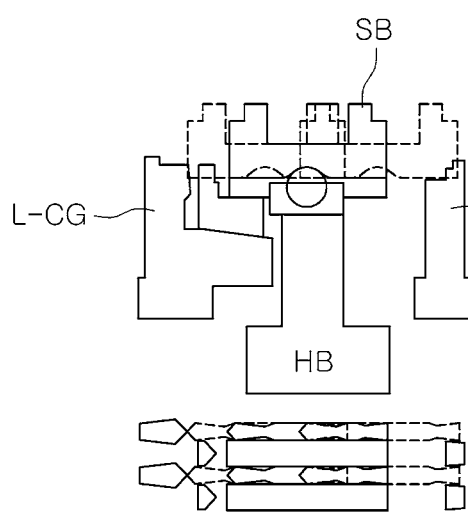

The FIG. 4C is a state in which the sleeve is sufficiently in mesh with the right clutch gear H-CG but is not in mesh with the left clutch gear L-CG, so baulking occurs.

Figure 4D:
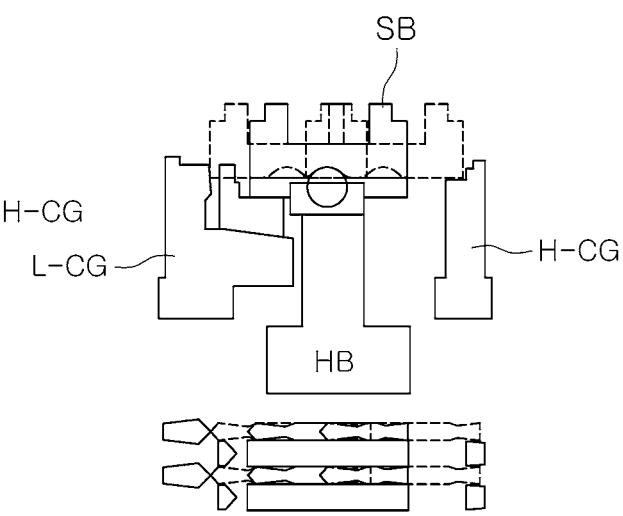

The FIG. 4D is the state in which baulking of the sleeve SB occurs at both left and right sides.

When an electric vehicle provided with the transmission having the configuration described above is in a ready-on state and the controller CLR performs referencing by moving the sleeve SB axially left and right, the maximum stroke of the sleeve SB may be measured in a total of four cases, as described above, so it is required to appropriately set the neutral position of the sleeve SB for these cases.

For reference, in each of the FIGS. 4A, 4B, 4C and 4D, the upper one shows the axial movement of the sleeve SB in a radial cross-section of the hub HB and the lower one shows the axial movement of the sleeve SB in the term shown in FIG. 2.

Hereafter, a chamfer inclined with respect to an axial direction on the sleeve gear SG, as generally, is referred to as an 'inclined chamfer'.

Accordingly, the portion on which an inclined chamfer is formed in the sleeve gear SG may be engaged with a clutch gear L-CG of the low-stage driven-gear LP which is a clutch gear having a chamfer inclined with respect to the axial direction thereof to correspond to the above inclined chamfer, and the portion on which the flat chamfer Y of the sleeve gear SG is formed may be engaged with a clutch gear H-CG of the high-stage driven-gear HP which is a clutch gear having a flat chamfer X perpendicular to the axial direction thereof to correspond to the flat chamfer Y.

Figure 5:
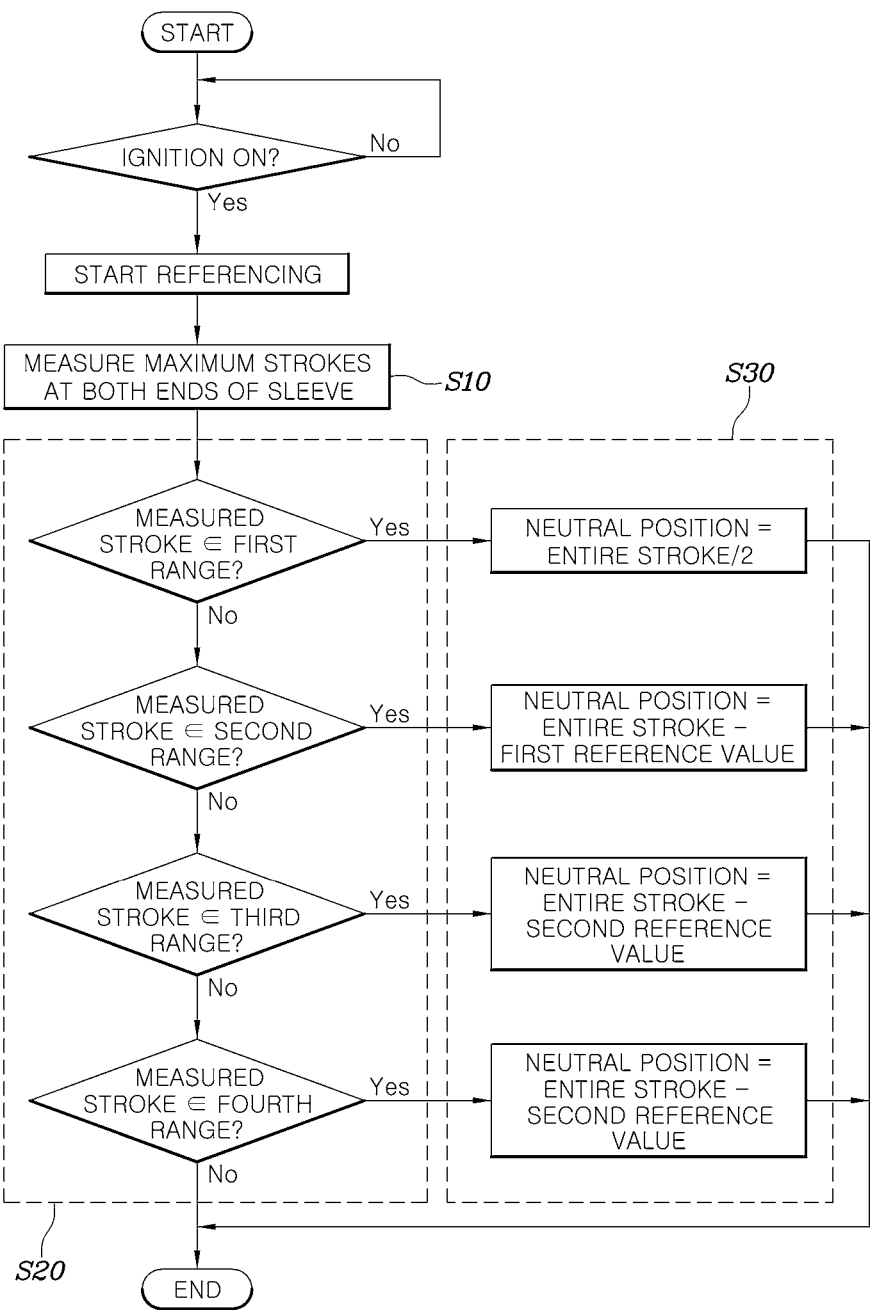
FIG. 5 is a flowchart showing an exemplary embodiment of a control method for a transmission of an electric vehicle according to various exemplary embodiments of the present invention.

FIG. 5 is a flowchart showing an exemplary embodiment of a method of performing referencing in read-on in an electric vehicle provided with a transmission having a sleeve gear SG having an inclined chamfer on a side and a flat chamfer Y on another side thereof. The method includes: measuring a maximum movable stroke of a sleeve SB having a sleeve gear SG by moving the sleeve SB axially to both sides by a controller CLR (S10); determining a reference range to which the measured maximum stroke pertains from predetermined reference ranges by the controller CLR (S20); and determining and setting a neutral position of the sleeve SB using a predetermined determination method, depending on the determined reference range by the controller CLR (S30).

The predetermined reference ranges includes a first range, a second range, a third range, and a fourth range that depend on four different maximum strokes.

That is, when referencing is started, the controller CLR measures maximum strokes of the sleeve SB by moving the sleeve SB axially to both sides and the measured maximum strokes are a total of FIGS. 4A, 4B, 4C and 4D, as described above, depending on the relative positions in rotation directions of the hub HB, the low-stage driving-gear LD, and the high-stage driven-gear HP. In the exemplary embodiment of the present invention, the first range, the second range, the third range and the fourth range are set for each of the total of four cases and an appropriate neutral position of the sleeve SB is determined and set for each of the cases through predetermined determination methods set in advance for the reference ranges, respectively.

In the exemplary embodiment of the present invention, the first range, the second range, the third range and the fourth range are sequentially set in order of short maximum strokes among the first range, the second range, the third range and the fourth range.

For example, as shown in FIG. 4A, the maximum stroke measured as described above is 18.36 mm which is the largest, and in the instant case, the first range may be set as 18.36±0.401 (17.959~18.761) mm in consideration of a measurement error, etc.

As shown in FIG. 4B, the maximum stroke measured as described above is 16.8 mm, and in the instant case, the second range may be set as 16.8±0.38 (16.42~17.18) mm in consideration of a measurement error, etc.

As shown in FIG. 4C, the maximum stroke measured as described above is 14.58 mm, and in the instant case, the third range may be set as 14.58±0.415 (14.165~14.995) mm in consideration of a measurement error, etc.

As shown in FIG. 4D, the maximum stroke measured as described above is 13.02 mm, and in the instant case, the fourth range may be set as 13.02±0.394 (12.626~13.414) mm in consideration of a measurement error, etc.

Obviously, the ranges may be designed as values in statistically reasonable ranges through several tests on the corresponding transmission.

When the controller CLR performs referencing, the maximum stroke which is measured when the portion on which the inclined chamfer is formed in the sleeve gear SG is engaged with a corresponding clutch gear L-CH and the portion on which the flat chamfer Y is formed is also engaged with a corresponding clutch gear H-CG while the sleeve SB is moved axially left and right pertains to the first range.

Furthermore, the maximum stroke which is measured when portion on which the inclined chamfer is formed in the sleeve gear SG is engaged with a corresponding clutch gear L-CG and the portion on which the flat chamfer Y is formed is baulked by a corresponding clutch gear H-CG pertains to the second range.

Furthermore, the maximum stroke which is measured when portion on which the inclined chamfer is formed in the sleeve gear SG is baulked by a corresponding clutch gear L-CG and the portion on which the flat chamfer Y is formed is engaged with a corresponding clutch gear H-CG pertains to the third range.

Furthermore, the maximum stroke which is measured when portion on which the inclined chamfer is formed in the sleeve gear SG is baulked by a corresponding clutch gear L-CH and the portion on which the flat chamfer Y is formed is also baulked by a corresponding clutch gear H-CG pertains to the fourth range.

When a reference range to which a maximum stroke measured as described above pertains is determined, the controller CLR sets a neutral position of the sleeve SB in accordance with the determined range using a specifically determined method.

When the measured maximum stroke pertains to the first range, the neutral position of the sleeve SB is set as a position obtained by dividing the measured maximum stroke by 2.

That is, in the instant case, the maximum strokes are measured while the sleeve gear SG of the sleeve SB is smoothly engaged with two clutches at both sides, so half of the measured maximum stroke is set as the neutral position of the sleeve SB.

When the measured maximum stroke pertains to the second range, the neutral position of the sleeve SB is set as a position to which the sleeve SB has moved by a predetermined first reference value away from a position where the sleeve SB has maximally moved to the portion on which the inclined chamfer is formed.

In the instant case, the portion on which the inclined chamfer of the sleeve gear SB is engaged with a corresponding clutch gear L-CG and the portion on which the flat chamfer Y is formed is baulked by a corresponding clutch H-CG. Furthermore, in the instant case, the neutral position of the sleeve SB is set as a position to which the sleeve SB has moved by the first reference value from the position where the sleeve SB has maximally moved to the portion on which the inclined chamfer is formed, that is, the position where the sleeve gear SG is fully engaged with the clutch gear L-CG of the low-stage driven-gear LP.

Accordingly, the first reference value may be set as an average value obtained by repeating several times a test that moves the sleeve to an actual neutral position from a position where the portion on which the inclined chamfer of the sleeve gear SG is formed is engaged with the clutch gear L-CG of a corresponding low-stage driven-gear LP, etc.

When the measured maximum stroke pertains to the third range or the fourth range, the neutral position of the sleeve SB is set as a position to which the sleeve SB has moved by a predetermined second reference value away from a position where the sleeve SB has maximally moved to the portion on which the inclined chamfer is formed.

That is, when the measured maximum stroke pertains to the third range or the fourth range, in both cases, the portion on which the inclined chamfer of the sleeve gear SG is baulked without being engaged with the clutch gear L-CG of the low-stage driven-gear LP. In the instant case, the neutral position of the sleeve SB is set as a position where the sleeve SB has moved to the hub HB by the second reference value from a position where the inclined chamfer of the sleeve gear SG has been baulked by the clutch gear L-CG of the low-stage driven-gear LP.

Accordingly, the second reference value may be set as an average value obtained by repeating several time a test that moves the sleeve to an actual neutral position from a position where the portion on which the inclined chamfer of the sleeve gear SG is formed has been baulked by the clutch gear L-CG of a corresponding low-stage driven-gear LP, etc.

According to various exemplary embodiments of the present invention, as described above, it is possible to rapidly and accurately set appropriate neutral positions of a sleeve SB in various situations which may occur, depending on the states of the portions of a transmission, using maximum strokes obtained while a controller CLR axially moves the sleeve SB when an electric vehicle is in a ready-on state, whereby it is possible to more accurately control the sleeve when controlling shifting based on the neutral positions of the sleeve SB.

Furthermore, the term "controller" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller may be at least one microprocessor operated by a predetermined program which may include a series of commands for carrying out a method in accordance with various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling a transmission of a vehicle mounted with the transmission and having a sleeve gear having an inclined chamfer on a first side of the sleeve gear and a flat chamfer on a second side of the sleeve gear, the method comprising:
   measuring, by a controller, a maximum movable stroke of a sleeve having the sleeve gear by moving the sleeve axially to a first side and a second side of the sleeve;
   determining, by the controller, a reference range to which the measured maximum stroke pertains from at least a predetermined reference range; and
   determining and setting, by the controller, a neutral position of the sleeve, depending on the determined reference range; and
   controlling, by the controller, the transmission according to the set neutral position of the sleeve.

2. The method of claim 1, wherein the at least a predetermined reference range includes a first range, a second range, a third range, and a fourth range that depend on four different maximum strokes.

3. The method of claim 2, wherein the first range, the second range, the third range and the fourth range are sequentially set in order of short maximum strokes among the first range, the second range, the third range and the fourth range.

4. The method of claim 3, wherein when the sleeve is moved axially,
   among the four different maximum strokes, a maximum stroke which is measured when a portion on which an inclined chamfer is formed in the sleeve gear is engaged with a corresponding clutch gear and a portion on which a flat chamfer is formed is also engaged with a corresponding clutch gear pertains to the first range;
   among the four different maximum strokes, a maximum stroke which is measured when the portion on which the inclined chamfer is formed in the sleeve gear is engaged with a corresponding clutch gear and the portion on which the flat chamfer is formed is baulked by a corresponding clutch gear pertains to the second range;
   among the four different maximum strokes, a maximum stroke which is measured when the portion on which the inclined chamfer is formed in the sleeve gear is baulked by a corresponding clutch gear and the portion on which the flat chamfer is formed is engaged with a corresponding clutch gear pertains to the third range; and
   among the four different maximum strokes, a maximum stroke which is measured when the portion on which the inclined chamfer is formed in the sleeve gear is baulked by a corresponding clutch gear and the portion on which the flat chamfer is formed is also baulked by a corresponding clutch gear pertains to the fourth range.

5. The method of claim 4, wherein when the measured maximum stroke pertains to the first range, the neutral position of the sleeve is set as a position obtained dividing the measured maximum stroke of the first range by a number of two.

6. The method of claim 4, wherein when the measured maximum stroke pertains to the second range, the neutral position of the sleeve is set as a position to which the sleeve has moved by a predetermined first reference value away from a position where the sleeve has maximally moved to the portion on which the inclined chamfer is formed.

7. The method of claim 6, wherein the first reference value is set as a stroke of the sleeve from a position where the portion on which the inclined chamfer of the sleeve gear has been engaged with a corresponding clutch gear to the neutral position.

8. The method of claim 4, wherein when the measured maximum stroke pertains to the third range or the fourth range, the neutral position of the sleeve is set as a position to which the sleeve has moved by a predetermined second reference value away from a position where the sleeve has maximally moved to the portion on which the inclined chamfer is formed.

9. The method of claim 8, wherein the second reference value is set as a stroke of the sleeve from a position where the portion on which the inclined chamfer of the sleeve gear has been baulked by a corresponding clutch gear to the neutral position.

10. The method of claim 1, wherein the controller includes:
    a processor; and
    a non-transitory storage medium on which a program for performing the method of claim 1 is recorded and executed by the processor.

11. A non-transitory computer readable medium on which a program for performing the method of claim 1 is recorded.

* * * * *